United States Patent [19]

Nagase et al.

[11] Patent Number: 4,582,953
[45] Date of Patent: Apr. 15, 1986

[54] SOLAR CELL MODULE

[75] Inventors: Eiichi Nagase, Chiba; Hirofumi Tezuka, Shiga, both of Japan

[73] Assignee: Kyocera Corporation, Japan

[21] Appl. No.: 631,888

[22] Filed: Jul. 18, 1984

[30] Foreign Application Priority Data

Jul. 19, 1983 [JP] Japan ............................ 58-112972[U]
Jul. 19, 1983 [JP] Japan ............................ 58-112973[U]

[51] Int. Cl.⁴ ...................... H01L 31/04; H01L 25/02
[52] U.S. Cl. .................................. 136/259; 136/251; 357/74
[58] Field of Search ................. 136/251, 259; 357/74; 250/239

[56] References Cited

U.S. PATENT DOCUMENTS 4,199,894  4/1980  Fischer .................................. 46/17

FOREIGN PATENT DOCUMENTS 56-94675   7/1981  Japan .................................. 136/251
56-158486 12/1981  Japan .................................. 136/251
57-45979   3/1982  Japan .................................. 136/251
58-63181   4/1983  Japan .................................. 136/251

Primary Examiner—Aaron Weisstuch
Attorney, Agent, or Firm—Spensley Horn Jubas & Lubitz

[57] ABSTRACT

The present invention relates to a solar cell module comprising a projected section formed on a side of a module case including plural interconnected solar cell devices, a groove section formed on the opposite side to accommodate the projected section and terminals of the solar cell devices, which are provided on the projected section and the groove section so that the plural solar cell modules can be connected mechanically and electrically, whereby the first-engagement sections provided on the projected section of a module case are inserted into the second-engagement sections provided on the groove section of another module case so that plural module cases can be connected easily and securely to each other at the regular position. The present invention also relates to a solar cell module, wherein marks which indicate the insertion reference positions for insertion of the module cases and marks which indicate the regular connection positions for proper connection of the module cases are used for convenient connection and inspection.

6 Claims, 4 Drawing Figures

SOLAR CELL MODULE

BACKGROUND OF THE INVENTION

1. Field of the Invention

This invention relates to a solar cell module and more particularly to a solar cell module having an improved construction of plural solar cell modules to be connected securely and easily.

2. Prior Art

A solar cell module case including plural solar cell devices and having a concave section on its side wall and a convex section on its opposite side wall has been proposed, wherein the concave and convex sections have terminals for the solar cell devices, whereby the convex section of a module case is inserted into the concave section of another module cases so that both solar cell modules can be connected to each other electrically and mechanically.

However, the connection made by inserting the convex section of a module case into the concave section of another module case is susceptible to the force applied in the direction opposite to or perpendicular to the insertion direction. The connection is also susceptible to the force exerted to twist the module cases. If the module cases are connected one after another on a plane, the connection may be disconnected at some connection points. Even when the connection is not disconnected, the output of the solar cells cannot be obtained if the connection is improper. Thus the connected solar modules cannot function as solar cells.

Since solar cells are generally used outdoors, the electrical and mechanical connection of the solar cell modules must be done securely and firmly.

SUMMARY OF THE INVENTION

It is therefore an object of the present invention to eliminate the above-mentioned defects and to provide a solar cell module construction which allows electrical and mechanical connection of a plurality of solar cell modules to be done securely and easily. Other objects and advantages of the present invention will become more apparent in the following description when considered in connection with the accompanying drawings.

DETAILED DESCRIPTION OF THE PREFERRED EMBODIMENT

Figure 1A:
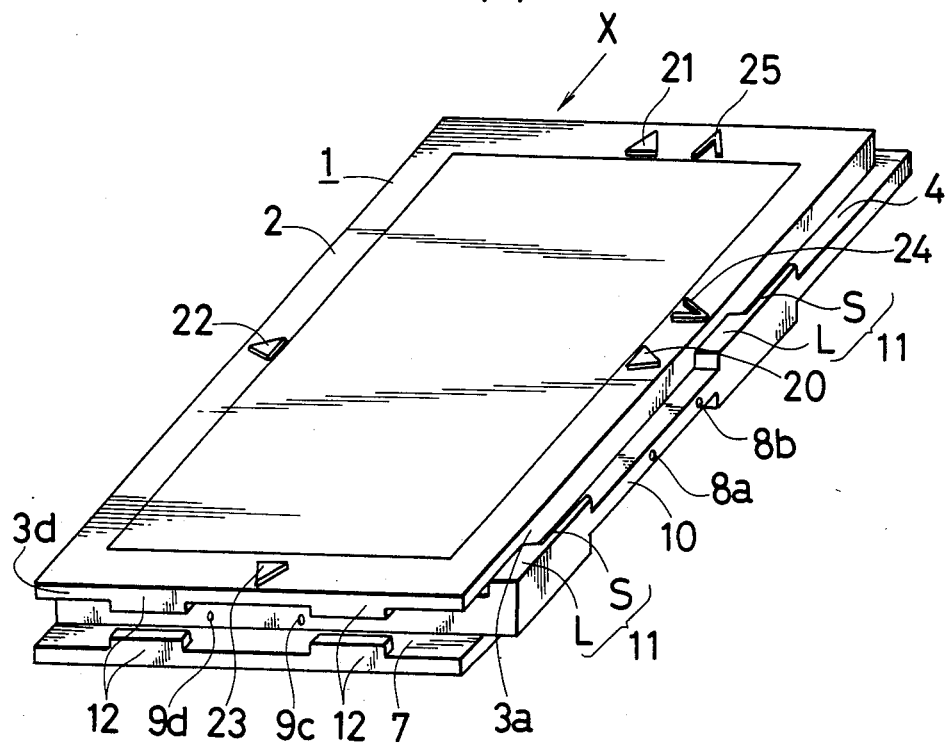
FIG. 1 (A) is a perspective view illustrating an embodiment of a solar cell module of the present invention.
FIG. 1(B) is a perspective view of the solar cell module 1 of FIG. 1 (A) taken in the X direction of FIG. 1 (A)
Figure 1B:
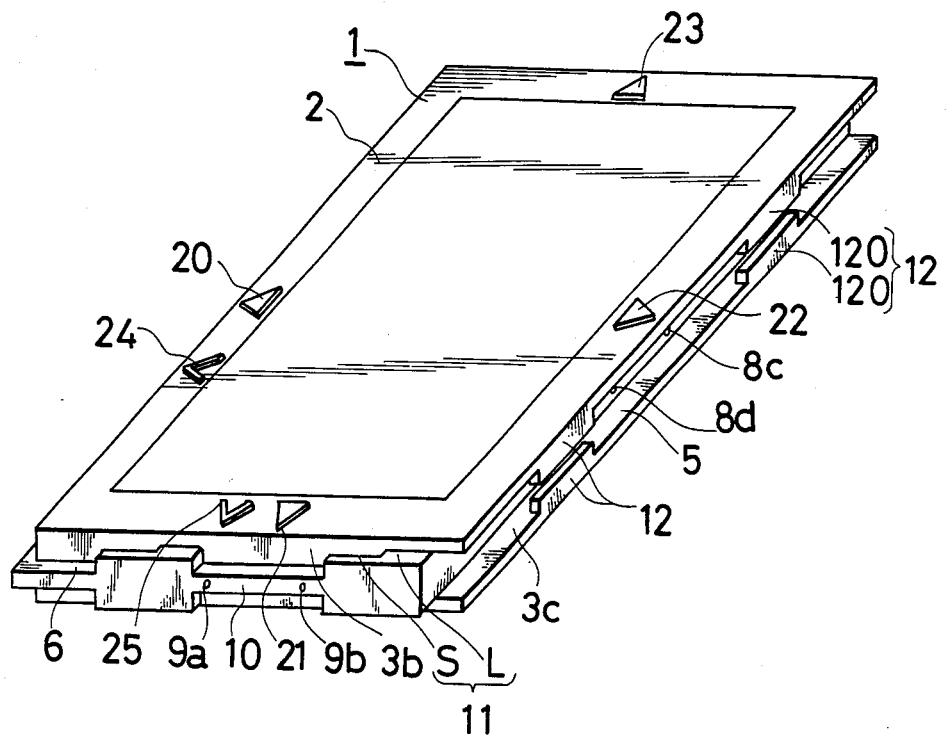

Referring now in detail to the drawings, a solar cell module 1 includes a module case 2 made of transparent glass or resin on its upper surface and plural solar cell devices which are accommodated in the module case 2 and connected electrically. The module case 2 is formed in a rectangular shape so that the module cases can be connected one after another in series, parallel or matrix. Projected sections 4 and 6 are formed on side walls 3a and 3b of the module case 2.

Recessed groove sections 5 and 7 are correspondingly formed on side walls 3c and 3d which are located on the opposite sides of the side walls 3a and 3b respectively.

Since the projected sections 4 and 6 are substantially identical to each other, and the groove sections 5 and 7 are also substantially identical to each other, only the projected section 4 and the groove section 5 are explained in detail to prevent repetition.

The projected section 4 is shown as a rail-shaped section 10 running nearly all along the center line of the side wall 3a of the module case 2. The rail-shaped section 10 is equipped with two engagement sections 11 which will be described later as the first-engagement sections. The thickness of the rail-shaped section 10 is determined so that it is able to be slid and inserted into the groove section 5 as described later. An L-shaped jutted section L and a groove space S enclosed by the L-shaped jutted section L are provided on the top and bottom surfaces of the rail-shaped section 10 to form each engagement section 11.

On the other hand, the groove section 5 is a straight channel formed along the entire length of the side wall 3c which is located on the opposite side of the side wall 3a of the module case 2. The second-engagement sections 12 are provided at two positions on the groove section 5, each of which is composed of a pair of projected walls 120 on the upper and lower surfaces of the groove section 5.

The second-engagement section 12 has configurations and dimensions so that it can be inserted or pressure-fit into the groove space S of the projected section 4. The space between a pair of the projected walls 120 is determined so that it can accommodate the rail section 10 of the projected section 4. The width of the groove section 5 where the second-engagement sections 12 are not provided is determined so that the space made by the groove section 5 can accommodate the L-shaped jutted section L. The depth of the groove section 5 is determined so that the projected section 4 can be fully inserted into the groove section 5 and so that the side wall 3a of a module case can contact the side wall 3c of another module.

When the projected section 4 of the module case is inserted into the groove section 5 of another module case to connect these two module cases, both cases are aligned in the longitudinal direction and the first-engagement section 11 of the projected section 4 abuts the second-engagement section 12 of the groove section 5 at the regular connection position where the terminals (described later) of the modules are connected to each other so that the projected section 4 cannot be directly inserted into the groove section 5. This connection method is described later.

Terminals 8a, 8b, 9a, and 9b of the solar cell devices are provided on the outer surfaces of the rail-shaped sections 10 of the projected sections 4 and 6 of the module case 2. Terminals 8c, 8d, 9c, and 9d are also provided on the inner surfaces of the groove sections 5 and 7. The terminals 8a–8d are connected to the solar cell devices in parallel, and the terminals 9a–9d are connected to the solar cell devices in series.

Accordingly, two modules can be connected in parallel by electrically connecting the terminals 8a and 8b provided on the projected section 4 of a module case to the terminals 8c and 8d (the distance between the terminals 8c and 8d is identical to that between the terminals 8a and 8b) provided on the groove section 5 of another module case. Furthermore, two modules can be connected in series by electrically connecting the terminals 9a and 9b on the projected section 6 of a module to the terminals 9c and 9d (the distance between the terminals 9c and 9d is identical to that between the terminals 9a and 9b) provided on the groove section 7 of another module case.

In addition, the preferred embodiment of the solar cell module of the present invention is provided with marks which indicate the specified insertion reference positions when the module cases are connected to each other. The embodiment is also provided with marks which indicate the positions where the module cases are properly connected.

For example, triangular marks 20, 21, 22, and 23 are respectively provided close to the side walls 3a, 3b, 3c, and 3d of the module case 2.

V-shaped marks 24 and 25 are respectively provided close to the side walls 3a and 3b.

When two module cases are connected to each other, the triangular marks 20, 21, 22, and 23 indicate whether the connection is done properly or not by judging whether the triangular marks are aligned with those on another module case or not.

The V-shaped marks 24 and 25 indicate the insertion reference positions when the projected sections 4 and 6 of a module case are respectively inserted into the groove sections 5 and 7 of another module case. The projected section 4 of a module case can be inserted into the groove section 5 of another module case for example by positioning both modules so that the V-shaped mark 24 on a module case is aligned with the triangular mark on another module and by inserting the projected section 4 into the groove section 5.

Figure 2:
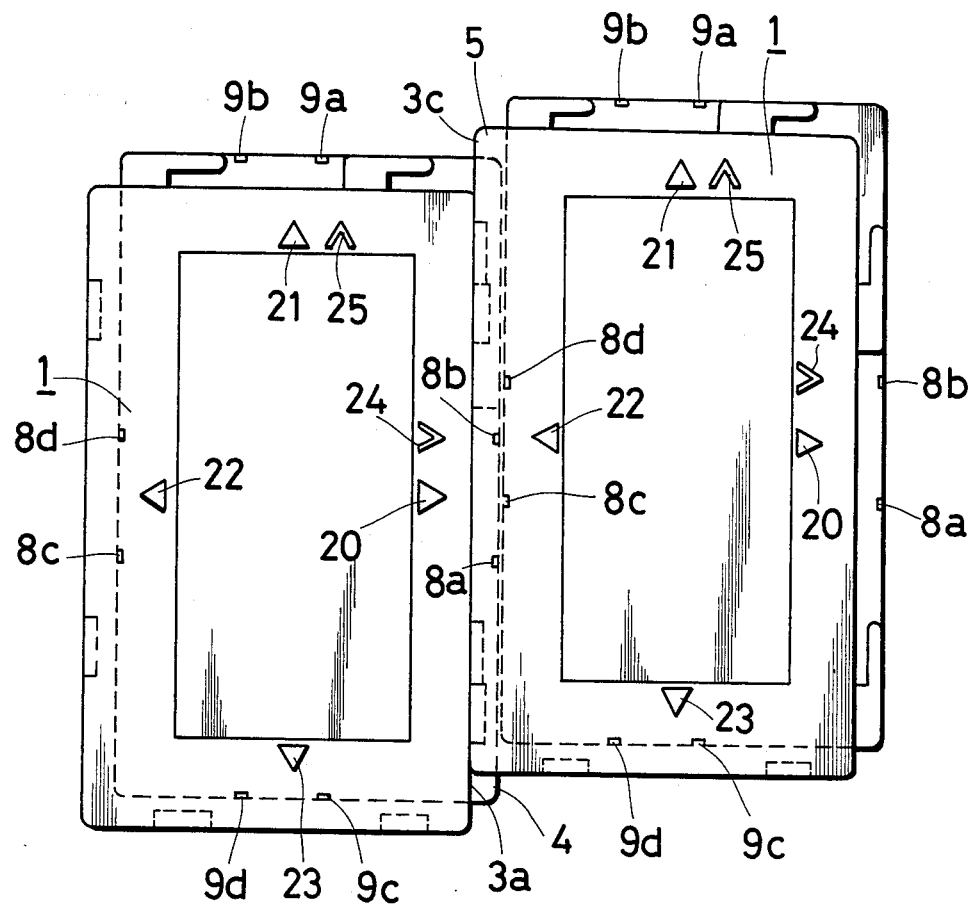
FIG. 2 and FIG. 3 are top views of the solar cell modules of the present invention to help explain the connection of the modules.
Figure 3:
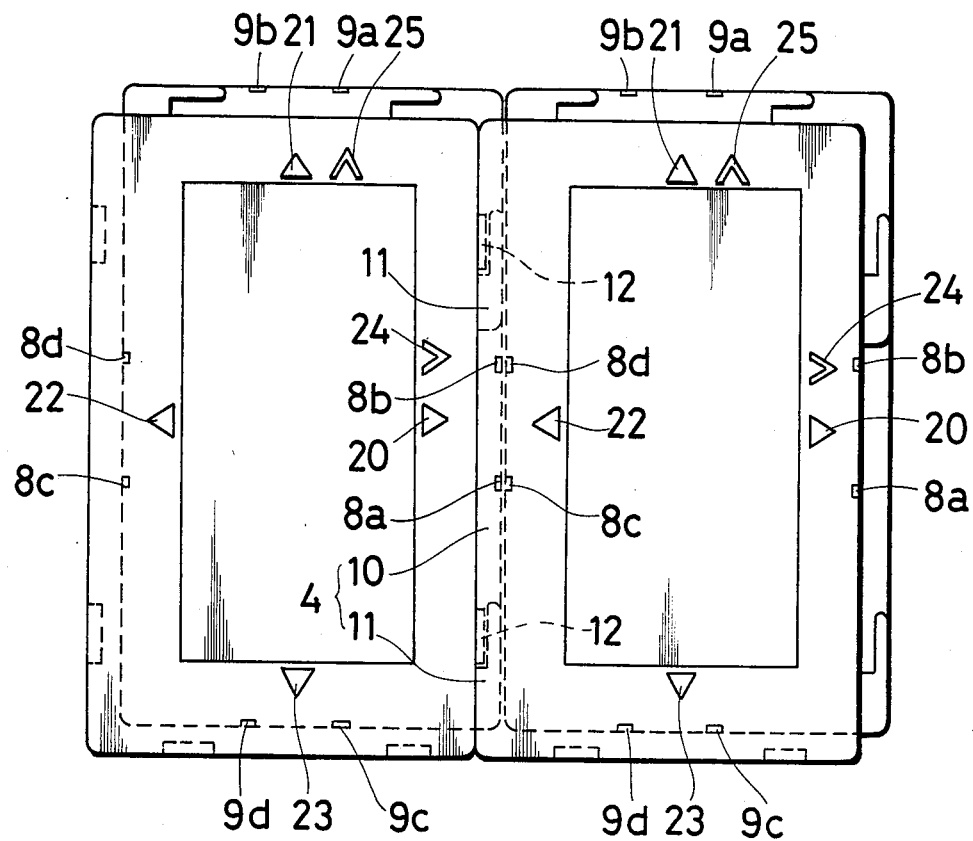

The connection operation of the module cases of the present invention is described below referring to FIGS. 2 and 3.

First, place two module cases so that the side wall 3a of a module case faces the side wall 3c of another module case and so that the pointed end of the V-shaped mark 24 of the former module case is aligned with the pointed end of the triangular mark 22 of the latter module case on a straight line (see FIG. 2), insert the engagement section 11 of the projected section 4 of the former module case into the groove section 5 of the latter module case and also insert rail-shaped section 10 of the projected section 4 of the former module case into the space between the upper and lower projected walls 120, 120 of the groove section 5 of the latter module case. Then slide one of the module cases so that the pointed end of the triangular mark 20 of the former module case is aligned with the pointed end of the triangular mark 22 of the latter module case.

By this sliding, the projected walls 120, 120 of the second-engagement sections 12 are pressure-fit or simply inserted into the groove spaces S of the first-engagement sections 11. In this way, both module cases are mechanically connected at the regular position when the pointed ends of the marks 20 and 22 are aligned with each other on a straight line (see FIG. 3). At the same time, the terminals 8a and 8b on the projected section 4 of the former module case are respectively connected to the terminals 8c and 8d on the groove section 5 of the latter module case. As a result, the solar cell devices in these module cases are electrically connected in parallel.

To connect the solar cell devices of the two module cases in series, insert the projected section 6 of the former module case into the groove section 7 of the latter module case and slide one of the module cases so that the engagement sections 11 and 12 are engaged with each other.

As a result, the terminals 9a and 9b are respectively connected to the terminals 9c and 9d. In this case, these module cases are connected to each other by using the triangular mark 21 and the V-shaped mark 25 of a module case and the triangular mark 23 of another module case. The connection method using these marks is omitted since it can be easily understood by reference to the above description. Having described the present invention as related to the embodiment described above, it is our intention that the invention be not limited by any of the details of description, but rather be construed broadly without departing from the spirit of the present invention. For example, the configurations and dimensions of the engagement sections provided on the projected section and the groove section of the module case can be changed in various forms, that is, the engagement sections 11 and 12 can have tapered surfaces for instance.

A round convex section (not shown) can be formed on the engagement surface, which forms the groove space S, of the first-engagement section 11 of the projected section, and a concave section mating with the convex section is formed on the engagement surface of the second-engagement section 12 so that the convex section is inserted into the concave section when the engagement sections 11 and 12 are engaged with each other. In this case, the engagement between the two modules is made stronger in the longitudinal direction as well as in the crosswise direction.

Furthermore, the projected sections and groove sections of the module cases can be changed variously. The marks can be represented by other shapes or symbols. The colors of the marks can also be changed according to the function and connection method even when the shapes of the marks remain unchanged.

Moreover, printed marks can be attached on the module cases.

As described above, the solar cell module of the present invention includes plural connected solar cell devices and has the projected sections and the groove sections on its side walls where the terminals of the solar cell devices are provided so that the first-engagement sections provided on the projected section of a module case are engaged with the second-engagement sections provided on the groove section of another module case and the terminals are connected to each other. Therefore, the solar cell module of the present invention has the following advantages:

(1) Plural modules can be connected mechanically and electrically at the same time.
(2) The connection section has a firm and secure construction and is highly resistant against forces applied to it after connection.
(3) Even when the connected modules are directed in the solar radiation direction by inclining them, subjected to vibration, or placed under other severe conditions, the firm connection of the modules is maintained and thus highly reliable electrical connection is obtained.
(4) The modules can be connected easily. Voltages with various electrical characteristics can be obtained by electrically connecting the modules as desired. In addition, the modules are superior in portability.
(5) Even when dust builds up on the groove sections of the module, dust is ejected when a module is slid into another module. Therefore, secure electrical connection is obtained.

(6) The insertion reference marks and the connection marks are provided on the solar cell modules to allow sequential connection of the modules. As a result, connection is made easy and incorrect or incomplete connection can be prevented.

Consequently, the present invention can provide a highly practical solar cell module.

What is claimed is:

1. A solar cell module, comprising:
   a solar cell module case for containing at least one solar cell device;
   a projected section formed on a side of the module case;
   a groove section formed on the opposite side of the case from said projected section to accommodate a projected section of a second identical module; and
   terminals of said solar cell device provided on said projected section and in said groove section, such that two identical module cases can be connected mechanically and electrically by inserting said projected section on said module into a groove section of the second identical module,
   said solar cell module being characterized in that said projected section extends along the side of said module case and has a first-engagement section which can be inserted into a groove section of said second identical module, and said groove section extends along the opposite side of said module case and has a second-engagement section which is positioned to contact a first-engagement sectionof said second identical module when a projected section of said identical module is inserted into said groove section of the module at the position where said first and second engagement sections do not abut with each other and said modules are slid relative to each other along their sides until said engagement sections are engaged with each other, said first and second engagement sections and said terminals being disposed so that said terminals contact the terminals on said identical module when said first and second engagement sections contact each other.

2. A solar cell module as defined in claim 1, wherein,
   said projected section is composed of a railshaped section running nearly all along the center line of a side of said module case in the longitudinal direction of said module case,
   said groove section is composed of a straight channel formed along the entire length of said module case in the longitudinal direction of said module case,
   said projected section having at least two of said first-engagement sections, each first engagement section being composed of L-shaped jutted sections which are formed on the top and bottom surfaces of said projected section, said L-shaped jutted sections defining groove spaces each of which is surrounded by said jutted section and the side wall of said module case, and wherein said groove section has at least two of said second-engagement sections, each second engagement section being composed of a pair of projected walls which are formed on the upper and lower sides of the groove section so that said projected walls face each other and are adapted to be slid into groove spaces of a second identical module.

3. A solar cell module as defined in claim 1, further comprising:
   marks which indicate the insertion reference positions for insertion of the projected section of said module into the groove section of a second identical module and marks which indicate the connection positions of said terminals for proper connection of said module cases, wherein both the insertion reference marks and the connection position marks are placed on the top surface of said module.

4. A solar cell module, comprising:
   a rectangular solar cell case, a first and a second side of said case each defining a groove which runs along each of said first and second sides, at least a portion of each groove being wider on the side of the groove toward the remainder of the case than on the side of the groove away from the case, the third and fourth sides of said case each defining an elongated projection which runs along each of said third and fourth sides, at least a portion of each of said projections being wider on the side of the projection that is away from the remainder of the case than on the side of the projection toward the case, wherein said grooves and projections are proportioned such that said projected sections are insertable into and engagable with the grooves of other identical modules;
   at least one electrical slide contact on each of said projections and in each of said grooves, said contacts being positioned such that the contacts on the projections can oppose contacts in the grooves of other identical modules when said projected sections are positioned within the grooves of said other identical modules.

5. The module of claim 4, further comprising:
   at least one first abutment adjacent to each of said projections and at least one second abutment adjacent to each of said grooves, wherein said first abutments are positioned along said projections and said second abutments are positioned along said grooves such that, when said projections are slid along the inside of the grooves of said identical modules, the first abutments of said module engage the second abutments on said identical modules to prevent further sliding motion of the modules when the electrical contacts on the projections of said module contact the electrical contacts within the grooves of said identical modules.

6. The module of claim 5, wherein:
   the first and third sides of the module define opposite sides of the module;
   the second and fourth sides of the module define the remaining two opposite sides of the module;
   the electrical contact on said first side and the electrical contact on said third side are wired such that electrical parallel connection of said module and a second identical module is achieved by contacting the electrical contact on the first side of said module with an electrical contact on the third side of said identical second module; and
   the electrical contact on said second side and the electrical contact on said fourth side are wired such that electrical series connection of said module and a second identical module is achieved by contacting the electrical connector on the second side of said module with an electrical contact on the fourth side of said second identical module.

* * * * *